(12) United States Patent
Shan (10) Patent No.: US 10,794,989 B2
(45) Date of Patent: Oct. 6, 2020

(54) METHOD OF USING A DIRECT SEQUENCE SPREAD SPECTRUM IN VEHICLE LOCATION APPROXIMATION WHEN USING ORTHOGONAL FREQUENCY-DIVISION MULTIPLEXING

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 91 days.

(21) Appl. No.: 16/271,567

(22) Filed: Feb. 8, 2019

(65) Prior Publication Data

US 2019/0219668 A1    Jul. 18, 2019

Related U.S. Application Data

(63) Continuation-in-part of application No. 16/248,761, filed on Jan. 15, 2019, and a continuation-in-part of
(Continued)

(51) Int. Cl.
*G01S 7/02* (2006.01)
*H04B 7/0413* (2017.01)
(Continued)

(52) U.S. Cl.
CPC .............. *G01S 7/023* (2013.01); *G01S 13/42* (2013.01); *G01S 13/931* (2013.01); *H04B 7/0413* (2013.01); *H04B 7/0617* (2013.01); *H04L 27/2607* (2013.01); *G01S 7/006* (2013.01); *G01S 13/726* (2013.01); *G01S 2013/9316* (2020.01)

(58) Field of Classification Search
CPC ........ G01S 7/023; G01S 13/42; G01S 13/931; G01S 2013/9316; G01S 13/726; G01S 7/006; H04B 7/0413; H04B 7/0617; H04L 27/2607
USPC ................................ 342/107, 104, 142, 175
See application file for complete search history.

(56) References Cited

U.S. PATENT DOCUMENTS

| | | | |
|---|---|---|---|
| 2013/0207865 A1* | 8/2013 | Shtrom et al. | H01Q 3/24 343/833 |
| 2016/0219024 A1* | 7/2016 | Verzun | H04L 9/0662 |

(Continued)

*Primary Examiner* — Bo Fan (57) ABSTRACT

A method for target location approximation using orthogonal frequency-division multiplexing (OFDM) is provided with an OFDM device that consists of a wireless terminal and a multiple-input and multiple-output (MIMO) antenna. In order to derive a location approximation, a pilot uplink signal is transmitted through the wireless terminal towards at least one intended target. The pilot uplink signal that is transmitted is encoded as a direct-sequence spread spectrum (DSSS). Next, a reflected-pilot uplink signal is identified from an ambient signal that returns after the initial transmission. The reflected-pilot uplink signal is decoded to retrieve the original data embedded in the pilot uplink signal. A matching time delay is calculated between the pilot uplink signal and the reflected-pilot uplink signal. A direction of arrival (DOA) is determined from the MIMO antenna. Finally, the matching time delay and the DOA are used for location approximation.

11 Claims, 13 Drawing Sheets

Related U.S. Application Data application No. 16/242,958, filed on Jan. 8, 2019, and a continuation-in-part of application No. 16/249,351, filed on Jan. 16, 2019, and a continuation-in-part of application No. 16/252,257, filed on Jan. 18, 2019, and a continuation-in-part of application No. 16/252,377, filed on Jan. 18, 2019.

(60) Provisional application No. 62/617,962, filed on Jan. 16, 2018, provisional application No. 62/616,844, filed on Jan. 12, 2018, provisional application No. 62/628,436, filed on Feb. 9, 2018, provisional application No. 62/630,416, filed on Feb. 14, 2018, provisional application No. 62/754,448, filed on Nov. 1, 2018, provisional application No. 62/756,318, filed on Nov. 6, 2018, provisional application No. 62/617,723, filed on Jan. 16, 2018, provisional application No. 62/618,735, filed on Jan. 18, 2018, provisional application No. 62/619,204, filed on Jan. 19, 2018.

(51) Int. Cl.
| | |
|---|---|
| *H04B 7/06* | (2006.01) |
| *G01S 13/931* | (2020.01) |
| *H04L 27/26* | (2006.01) |
| *G01S 13/42* | (2006.01) |
| *G01S 13/72* | (2006.01) |
| *G01S 7/00* | (2006.01) |

(56) References Cited

U.S. PATENT DOCUMENTS

| | | | |
|---|---|---|---|
| 2016/0265349 A1* | 9/2016 | Saulnier | E21B 47/16 |
| 2017/0033833 A1* | 2/2017 | Terry | H04B 1/7136 |
| 2018/0084581 A1* | 3/2018 | Terry | H04W 74/08 |

* cited by examiner

METHOD OF USING A DIRECT SEQUENCE SPREAD SPECTRUM IN VEHICLE LOCATION APPROXIMATION WHEN USING ORTHOGONAL FREQUENCY-DIVISION MULTIPLEXING

The current application claims a priority to the U.S. Provisional Patent application Ser. No. 62/628,436 filed on Feb. 9, 2018.

The current application also claims a priority to a U.S. non-provisional application Ser. No. 16/252,377 filed on Jan. 18, 2019. The U.S. non-provisional application Ser. No. 16/252,377 claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/630,416 filed on Feb. 14, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention relates generally to a method of vehicle location approximation through orthogonal frequency-division multiplexing. More specifically, the present invention utilizes a direct sequence spread spectrum in the process.

BACKGROUND OF THE INVENTION

Wireless communication networks and radar functionalities for vehicles is a fast-growing area of interest in the automobile industry and wireless technology research. The rapid growth is mainly due to the plethora of possibilities related to wireless technologies.

The present invention uses a multiple-input multiple-output (MIMO) antenna array to enhance $V_2X$ communication, wherein a target vehicle communicates and gathers information from moving objects that surround the target vehicle. By doing so, the present invention can track and locate multiple targets with greater accuracy. The present invention also intends to address issues that can occur from interference and jamming generated from other vehicles equipped with $V_2X$ transceivers.

To fulfill the intended objectives, the present invention introduces a novel system and design for automobile radar and communications networks and related applications. More specifically, the present invention is an optimal filtering system and pilot signal detection approach that provides the location of a vehicle via an orthogonal frequency-division multiplexing (OFDM) device that can use varying communication wave technologies. Fourth generation wireless (4G), fifth generation wireless (5G), 4G-long term evolution (4G-LTE), and Wi-Fi are some of the communication standards that can be used with the present invention. By utilizing the present invention, the need for a separate radar device in a vehicle can be eliminated.

DETAIL DESCRIPTIONS OF THE INVENTION

All illustrations of the drawings are for the purpose of describing selected versions of the present invention and are not intended to limit the scope of the present invention.

The present invention introduces a method to improve vehicle location approximation. To do so, the present invention utilizes communication standards that can be, but is not limited to, fourth generation (4G) wireless, fifth generation (5G), 4G-long term evolution (4G-LTE), and Wi-Fi. The present invention introduces a method that can be used to manipulate the pilot uplink signal that initiates the vehicle location approximation process. By doing so, the present invention can act as a passive radar that detects surrounding objects such as other vehicles, pedestrians, and other still or moving objects. Moreover, the present invention can also detect the speeds, locations and characteristics of these surrounding objects.

Figure 1:
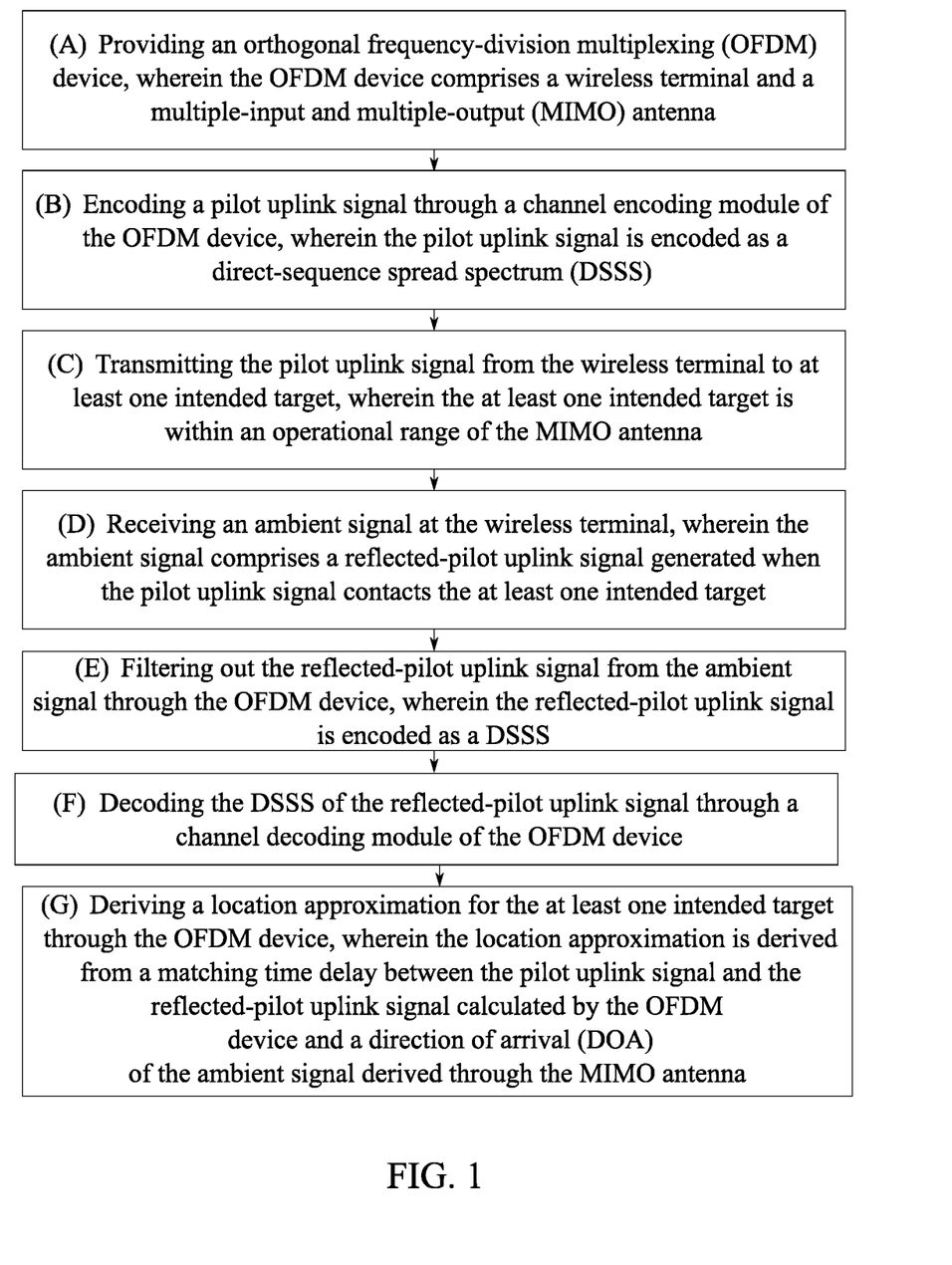
FIG. 1 is a flowchart illustrating the basic overall process of the present invention.

As shown in FIG. 1, to fulfill the intended functionalities, the present invention is provided with an orthogonal frequency-division multiplexing (OFDM) device that comprises a wireless terminal and a multiple-input and multiple-output (MIMO) antenna (Step A). The wireless terminal functions as an access point for an outgoing signal and an incoming signal. On the other hand, the MIMO antenna is used to determine the direction of arrival of a specific signal, which is then used in the process of determining the overall location of a vehicle. Preferably, the MIMO antenna is an antenna array which is communicably coupled with the wireless terminal.

Figure 2:
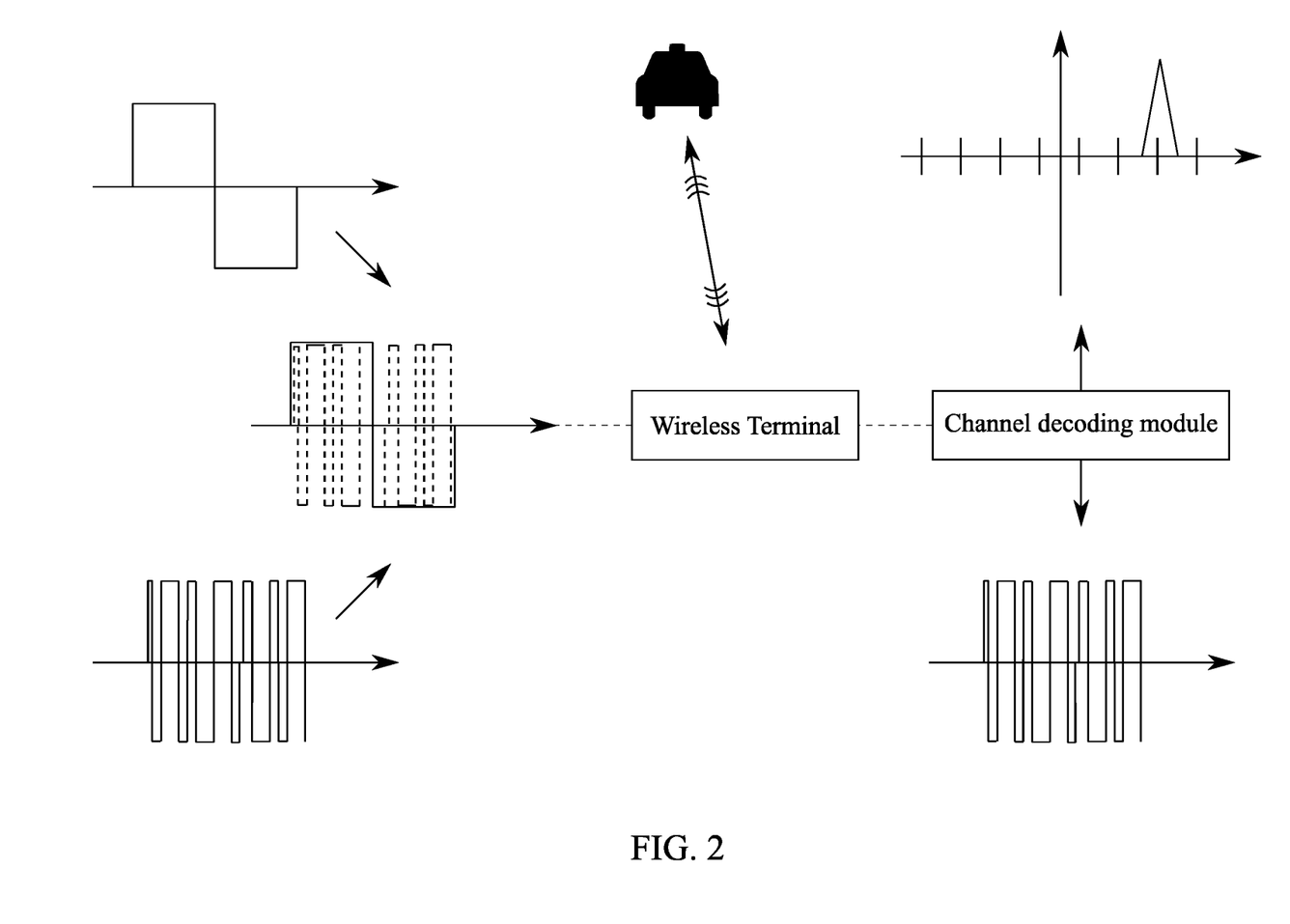
FIG. 2 is an illustration of the encoding and decoding process used in the present invention.
Figure 10:
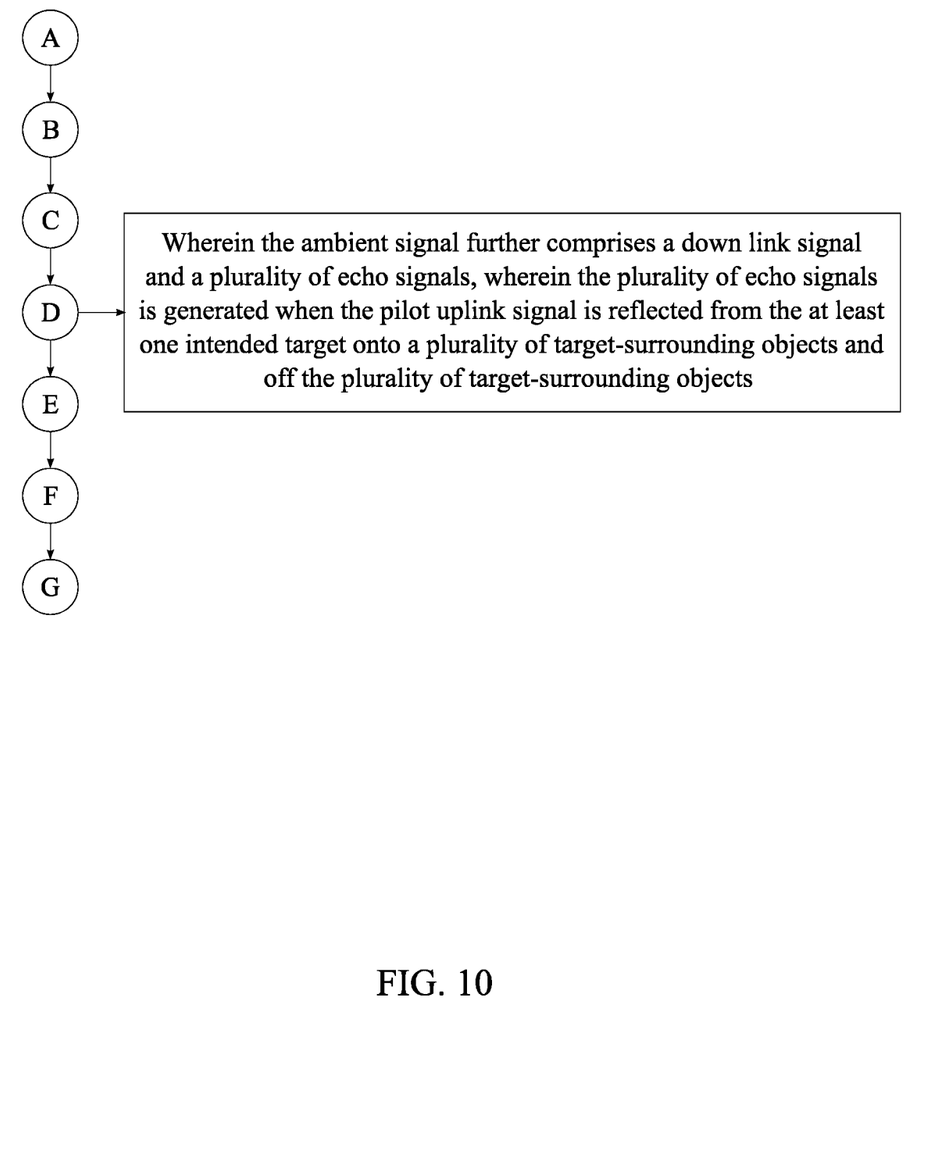
FIG. 10 is a flowchart illustrating the basic overall process of receiving an ambient signal at the wireless terminal.
Figure 11:
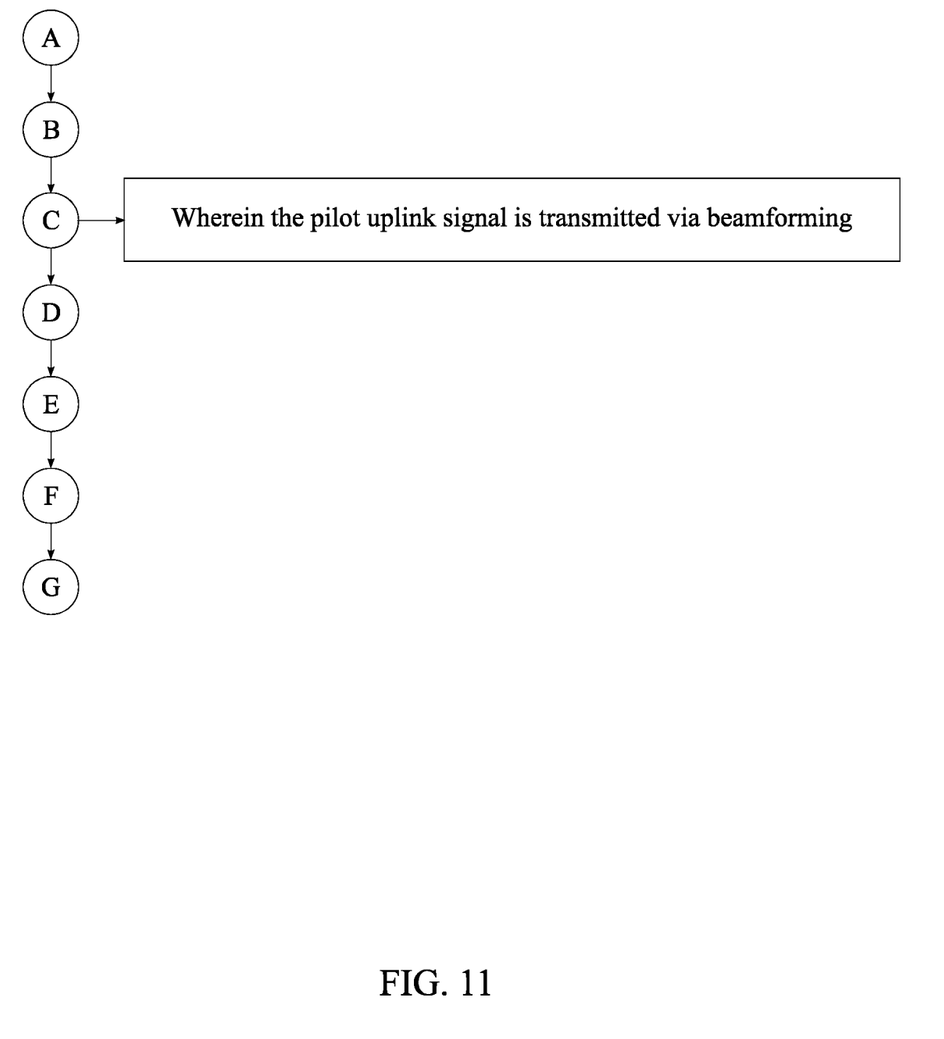
FIG. 11 is a flowchart illustrating the basic overall process of transmitting the pilot uplink signal via beamforming.
Figure 12:
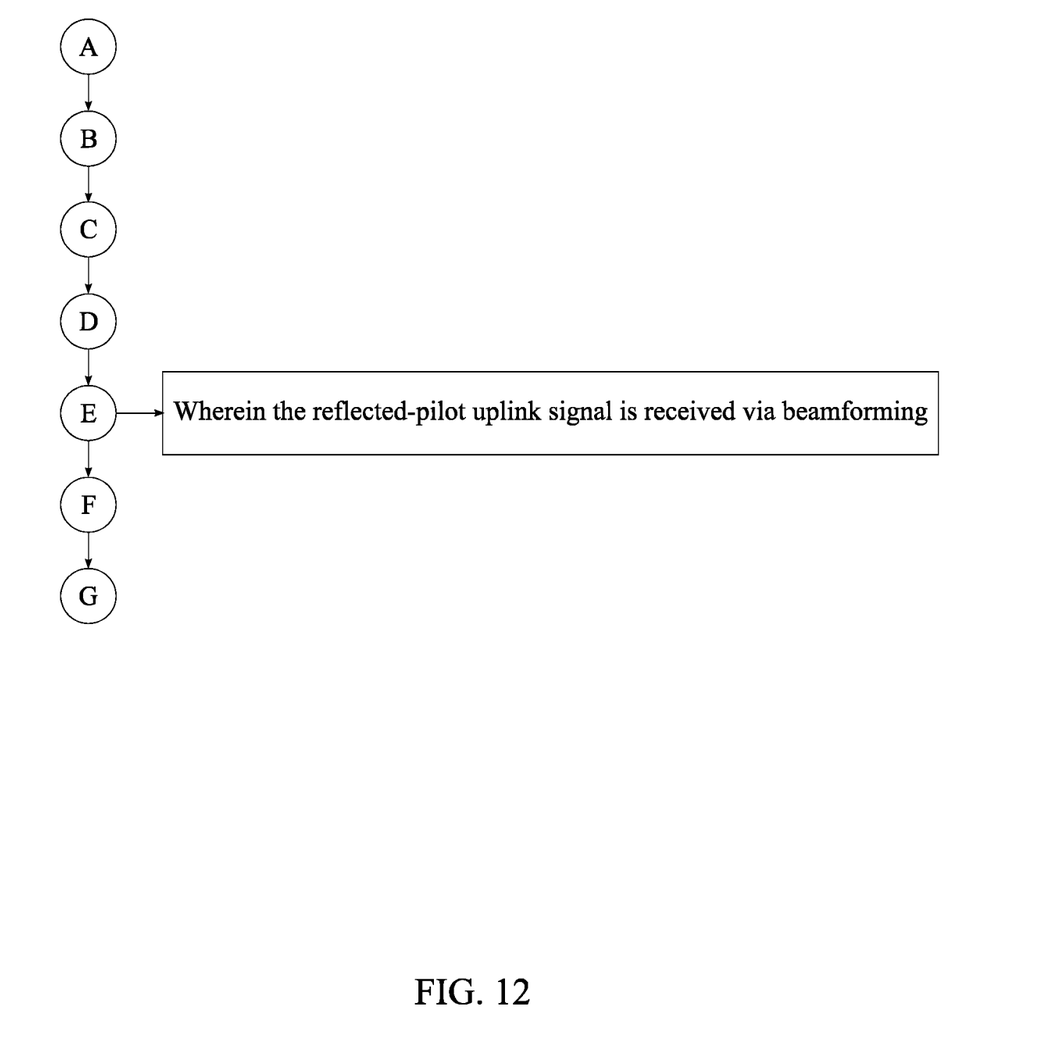
FIG. 12 is a flowchart illustrating the basic overall process of receiving the reflected-pilot uplink signal via beamforming.

As an initial step of locating a target, the present invention transmits a pilot uplink signal from the wireless terminal to at least one intended target that is within an operational range of the MIMO antenna (Step C). However, as seen in FIG. 2, the pilot uplink signal is encoded through a channel encoding module of the OFDM device prior to transmission (Step B). As seen in FIG. 11, the pilot uplink signal, which is preferably transmitted via beamforming, is encoded as a direct-sequence spread spectrum (DSSS) such that a rapid phase transition is introduced to the data. By doing so, the data of the pilot uplink signal is spread along a larger bandwidth allowing the OFDM device to process both radar functionalities and wireless communication functionalities. When the transmission process is complete, the wireless terminal proceeds to receive an ambient signal which comprises a reflected-pilot signal, wherein the reflected-pilot uplink signal is generated when the pilot uplink signal contacts the at least one intended target (Step D). Preferably, as seen in FIG. 12, the reflected-pilot uplink signal is received via beamforming as well. As shown in FIG. 10, in addition to the reflected-pilot uplink signal, the ambient signal further comprises a downlink signal and a plurality of echo signals. The downlink signal is transmitted from a satellite to the wireless terminal. On the other hand, the plurality of echo signals is generated when the pilot uplink signal is reflected from at least one intended onto a plurality of target-surrounding objects and off the plurality of target-surrounding objects which can be, but is not limited to, cars, pedestrians, and animals.

Figure 13:
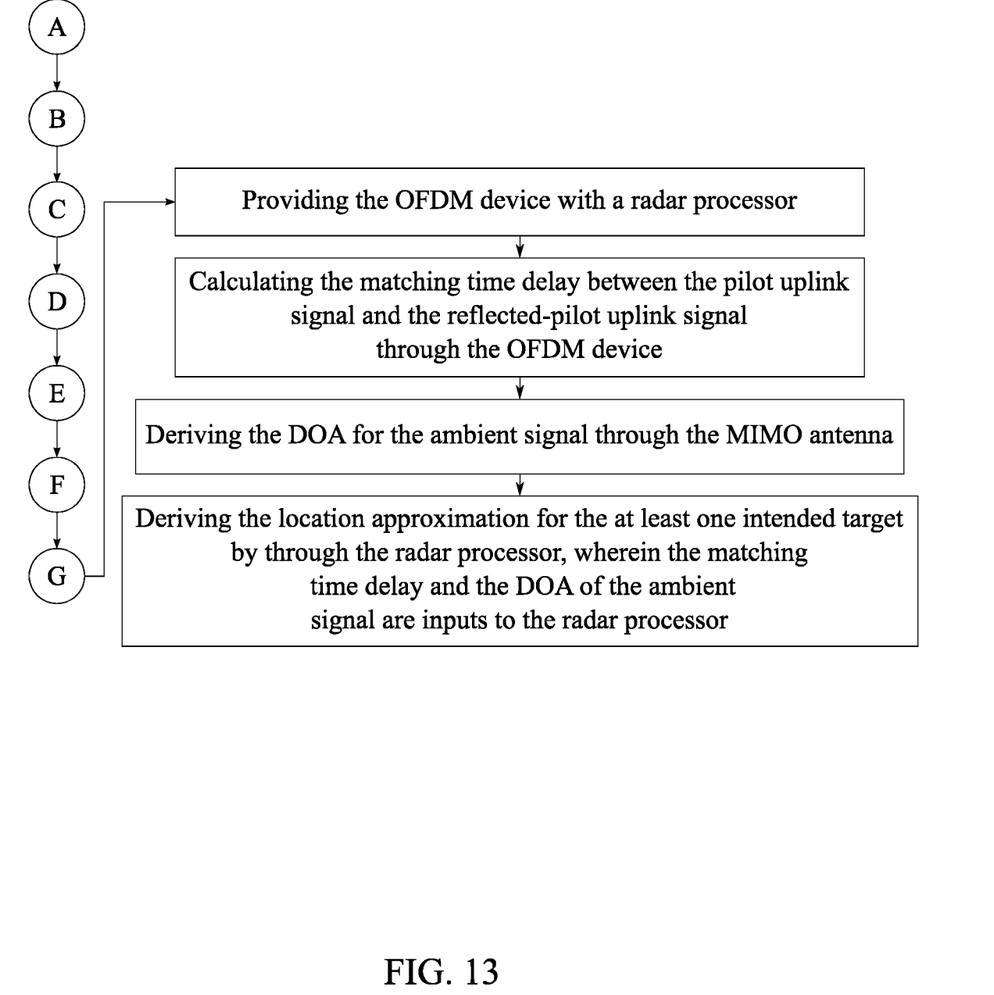
FIG. 13 is a flowchart illustrating the basic overall process of using a radar processor in the location approximation process.

To extract original data that was embedded in the pilot uplink signal, the reflected-pilot uplink signal is filtered out from the ambient signal through the OFDM device (Step E). When the reflected-pilot uplink signal is identified, the present invention proceeds to decode the DSSS through a channel decoding module of the OFDM device in order to retrieve the original data from the pilot uplink signal (Step F). By doing so, a matching time delay between the reflected-pilot uplink signal and the pilot uplink signal can be calculated through the OFDM device. Simultaneously, the present invention derives a direction of arrival (DOA) for the ambient signal, wherein the DOA is derived through MIMO antenna of the OFDM device. When both the matching time delay and the DOA are determined, the present invention proceeds to derive a location approximation for the at least one intended target through the OFDM device (Step G). More specifically, the matching time delay calculated through the OFDM device is used with the DOA determined through the MIMO antenna to derive the location approximation for the at least one intended target. Preferably, as shown in FIG. 13, the OFDM device is provided with a radar processor that receives the matching time delay and the DOA as inputs in order to derive the location approximation.

Figure 3:
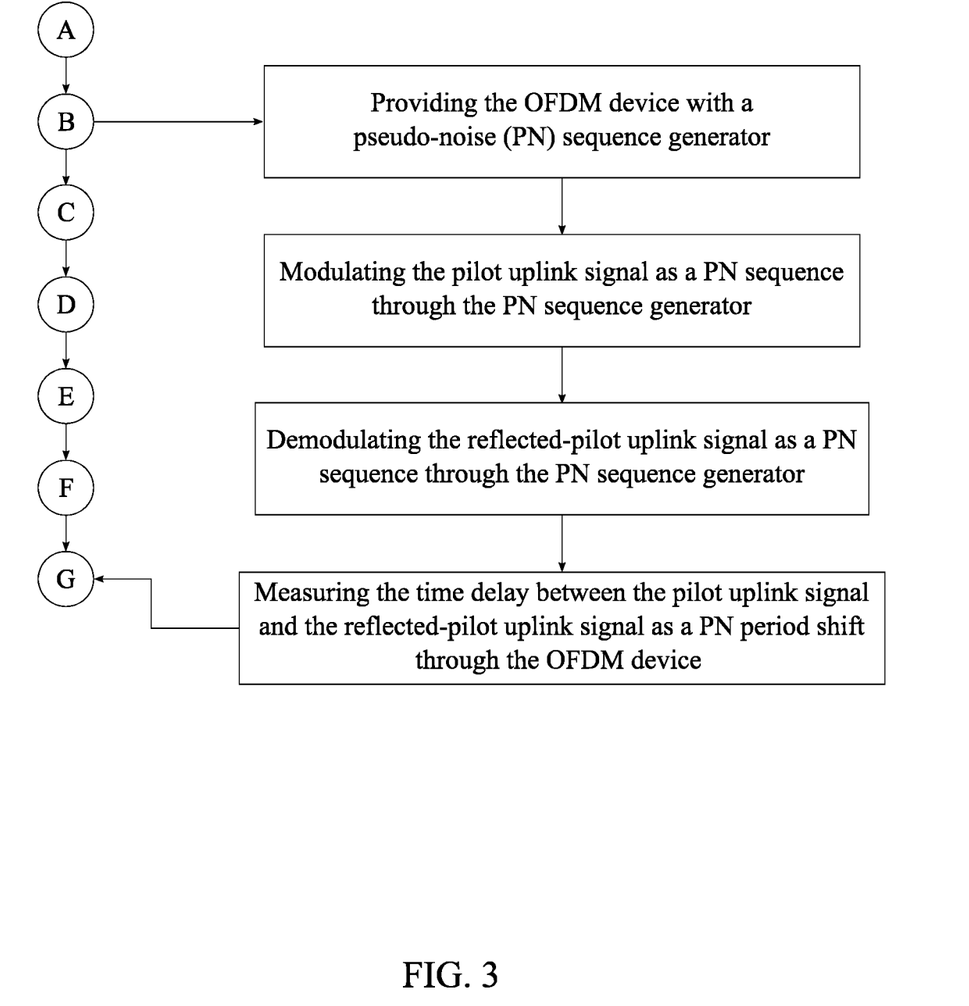
FIG. 3 is a flowchart illustrating the basic overall process of using a PN sequence generator for the pilot uplink signal.

As shown in FIG. 3, to spread the data of the pilot uplink signal through DSSS, the OFDM device is provided with a pseudo-noise (PN) sequence generator. Therefore, the present invention can modulate the pilot uplink signal as a PN sequence through the PN sequence generator. When the reflected-pilot uplink signal is received at the wireless terminal, the present invention demodulates the reflected-pilot uplink signal as a PN sequence through the PN sequence generator. By utilizing a PN period shift between the pilot uplink signal and the reflected-pilot uplink signal, the matching time delay between the pilot uplink signal and the reflected-pilot uplink signal is measured.

Figure 4:
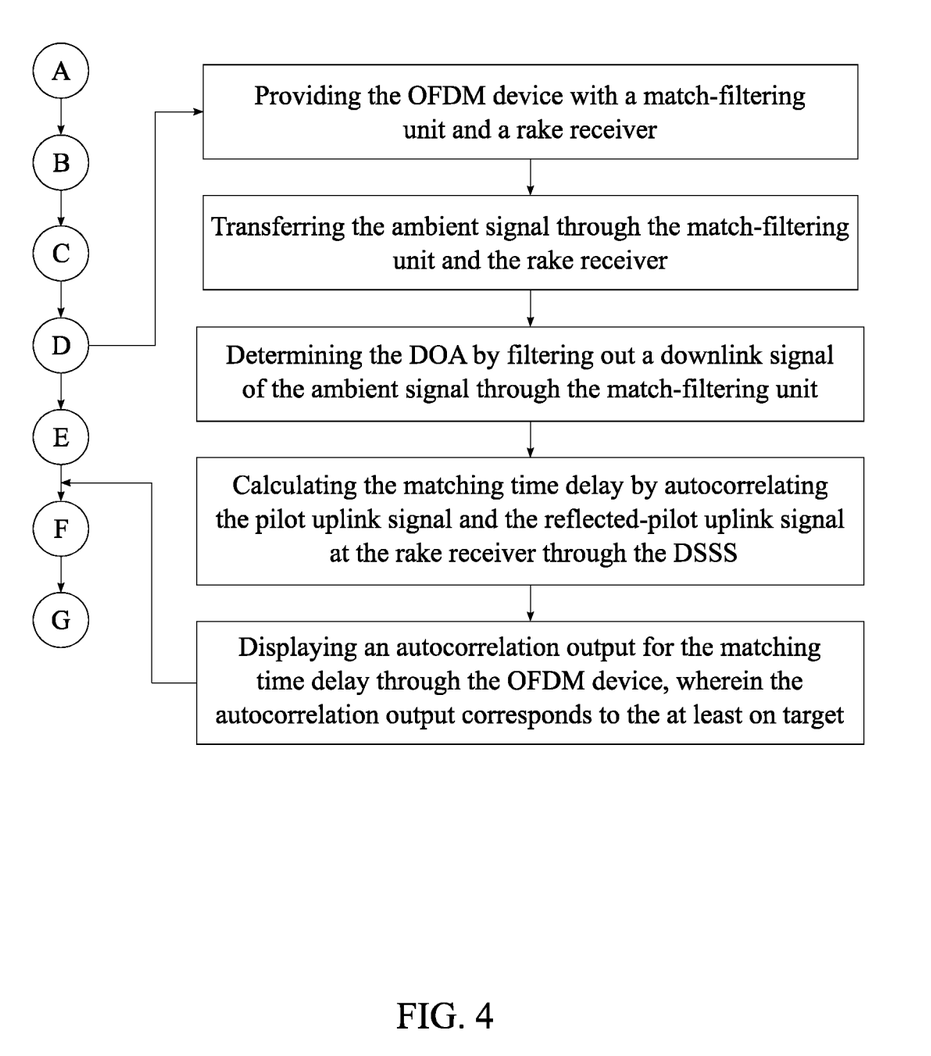
FIG. 4 is a flowchart illustrating the basic overall process of using a match-filtering unit and a rake receiver for the ambient signal.
Figure 5:
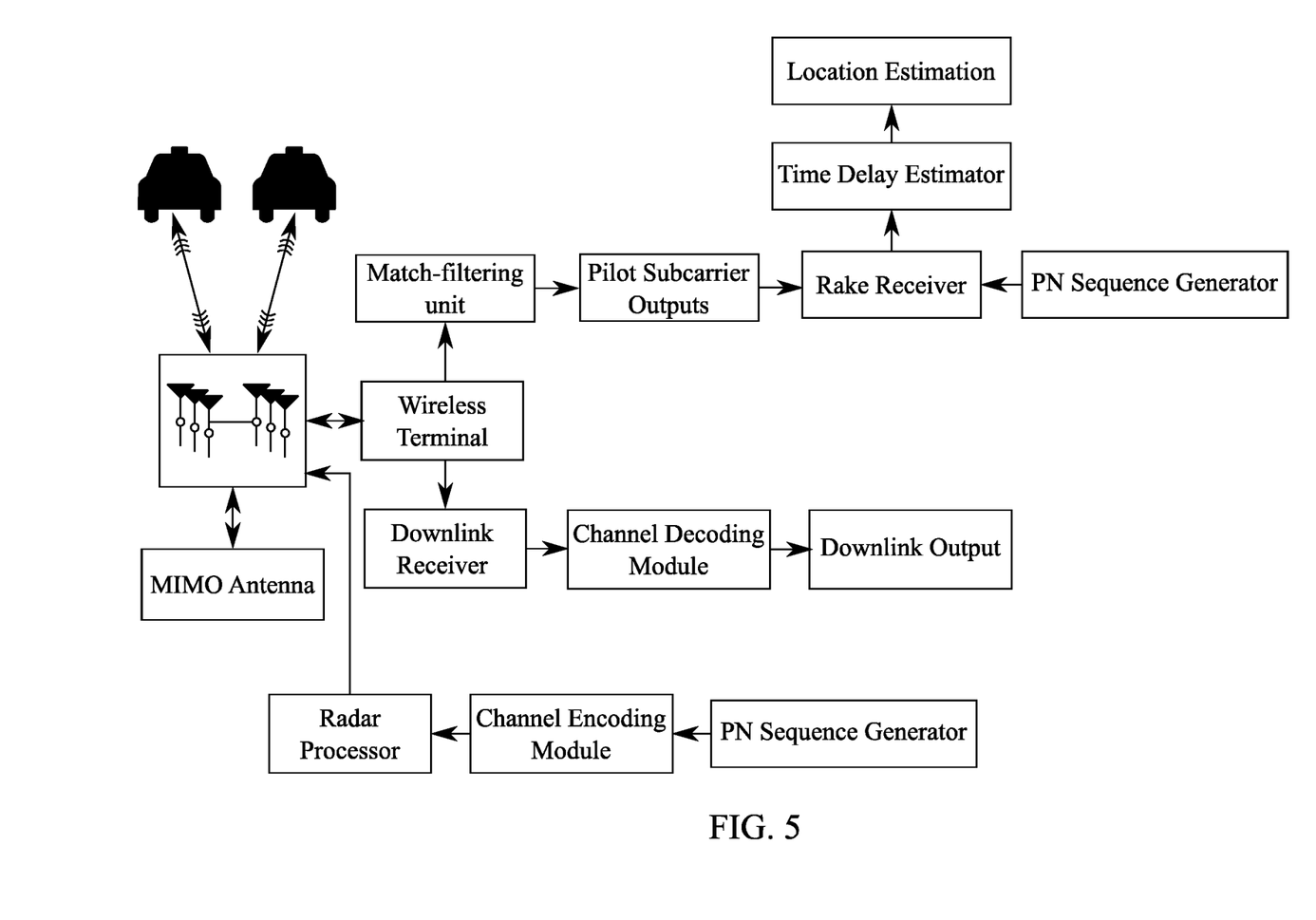
FIG. 5 is an illustration of using the match-filtering unit and the rake receiver.
Figure 9:
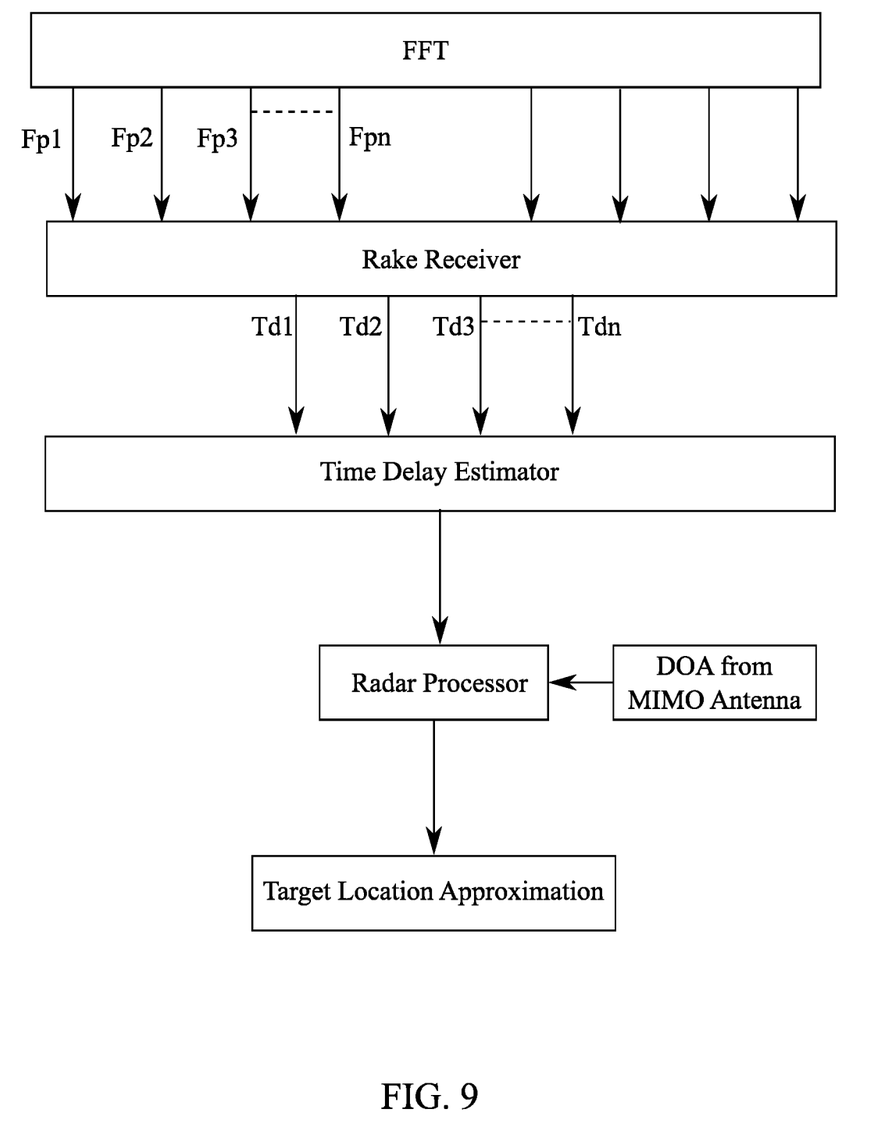
FIG. 9 is a block diagram illustrating the time delay estimation process through the rake receiver.

As seen in FIG. 4, FIG. 5, and FIG. 9, in order to counter the effects of multipath fading, the present invention provides the OFDM device with a match-filtering unit and a rake receiver. When the ambient signal is received, the present invention proceeds to transfer the ambient signal through the match-filtering unit and the rake receiver. By doing so, the downlink signal is filtered out by the match-filtering unit and is used in the process of determining the DOA with the use of the MIMO antenna. Next, the present invention executes an autocorrelation process to determine the similarities between the pilot uplink signal and the reflected-pilot uplink signal. More specifically, to calculate the matching time delay, the present invention autocorrelates the pilot uplink signal and the reflected-pilot uplink signal at the rake receiver through the DSSS. In doing so, the rake receiver performs the autocorrelating function for each subcarrier of the pilot uplink signal, wherein the pilot uplink signal comprises a plurality of subcarriers. As an example, if we assume that the total number of targets is d, N is the pilot subcarrier number, and $T_{dN}$ is the $N^{th}$ subcarrier time delay, a resulting output of $N*T_{dN}$ will be fed into a statistical optimal filter to calculate the final estimation of $T_D$. In this instance, $T_D$ is a vector of dimension D, d=1, 2, 3, . . . , D. The process can be executed in parallel to get real-time location information.

Figure 8:
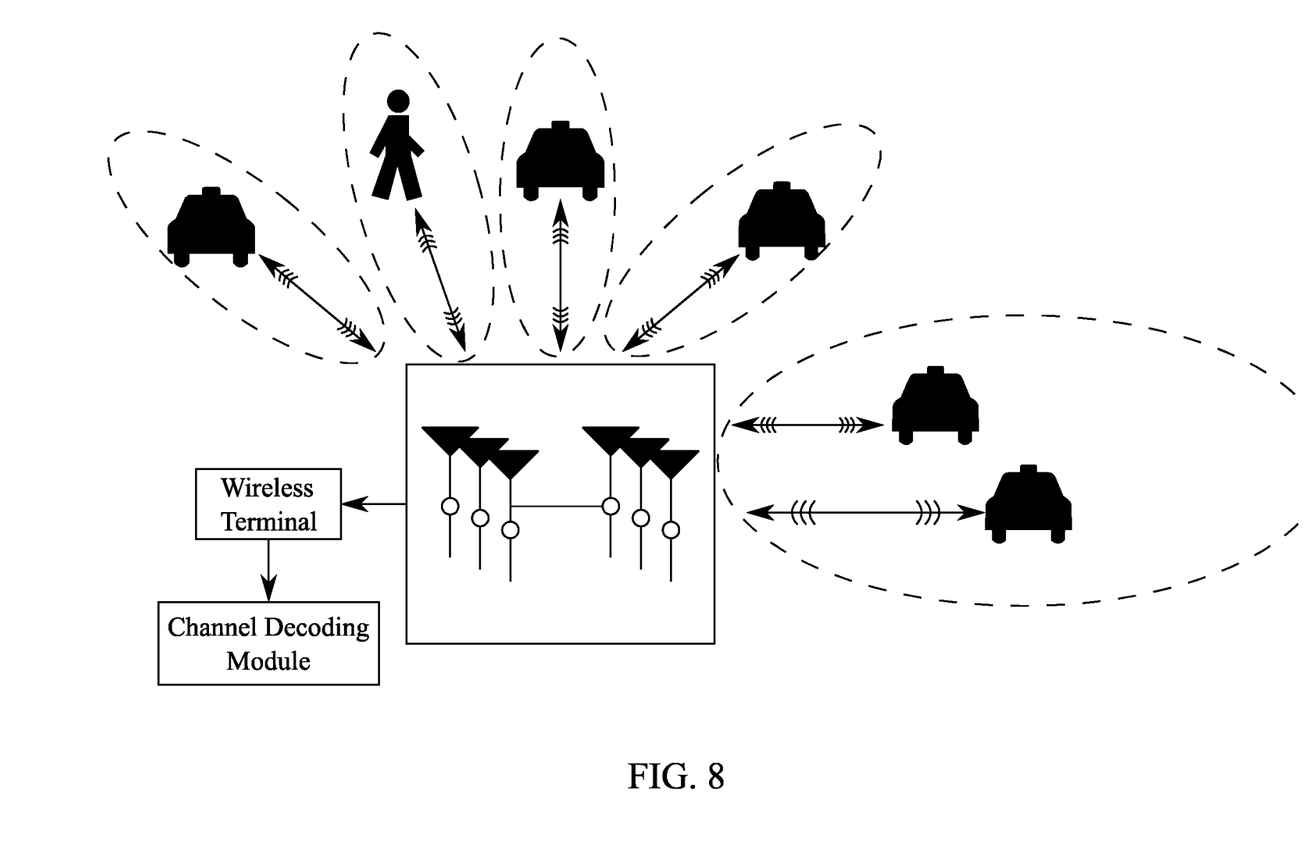
FIG. 8 is an illustration of utilizing the present invention to determine the location of multiple targets.

When the autocorrelation process is complete, the OFDM device displays an autocorrelation output through the OFDM device, wherein the autocorrelation output corresponds to the at least one intended target. Since a PN sequence is preferably used, the present invention displays the autocorrelation output as a peak representing the at least one intended target, wherein the OFDM device is used for displaying purposes. When the at least one intended target is a plurality of targets, the present invention receives a corresponding reflected-pilot uplink signal from each of the plurality of targets. If there are multiple targets as seen in FIG. 8, the autocorrelation output will display multiple peaks through the OFDM device. Each of the peaks will correspond to a target within the operational range of the MIMO antenna. Since the PN sequence is preferably used within the pilot uplink signal, each of the peaks displayed by the OFDM device corresponds to a PN number that can be used to calculate the matching time delay. Therefore, the matching time delay can be represented as $T_d=N*T_p$, wherein N is the PN number corresponding to the peak and $T_p$ is the time duration of the PN code.

Figure 6:
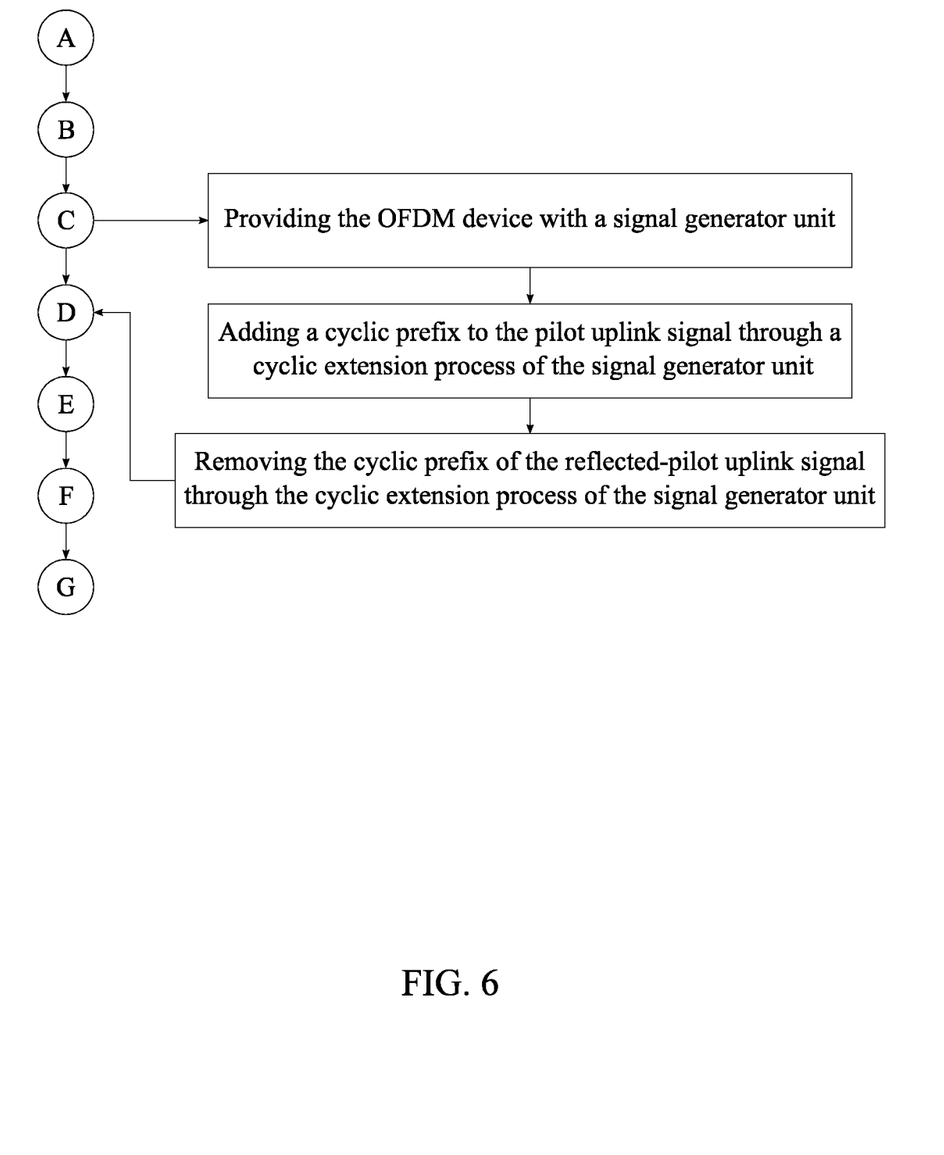
FIG. 6 is a flowchart illustrating the basic overall process of using a signal generator unit to add a cyclic prefix to the pilot uplink signal.
Figure 7:
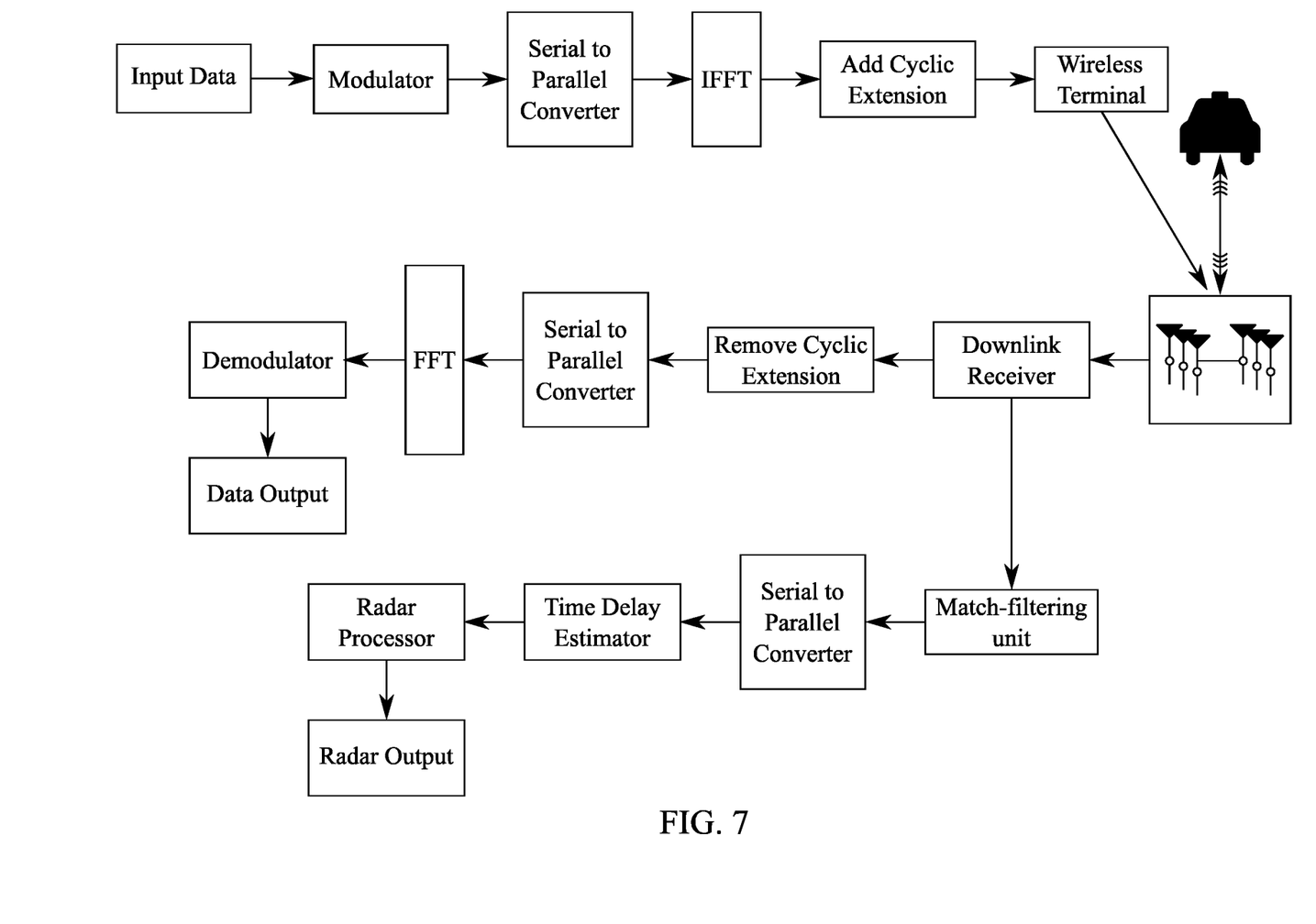
FIG. 7 is an illustration of the cyclic extension process of the signal generator unit.

As shown in FIG. 6 and FIG. 7, to provide a guard interval to eliminate inter-symbol interference and provide robustness to the pilot uplink signal, the OFDM device is provided with a signal generator unit. By utilizing the signal generator unit, a cyclic prefix can be added into the pilot uplink signal through a cyclic extension process. The cyclic prefix is included in the pilot uplink signal so that each OFDM symbol of the pilot uplink signal is preceded by a copy of an end part of the same OFDM symbol. When the reflected-pilot uplink signal is received at the wireless terminal, the present invention removes the cyclic prefix of the reflected-pilot uplink signal through the cyclic extension process and proceeds to calculate the time delay between the pilot uplink signal and the reflected-pilot uplink signal.

Although the invention has been explained in relation to its preferred embodiment, it is to be understood that many other possible modifications and variations can be made without departing from the spirit and scope of the invention as hereinafter claimed.

What is claimed is:

1. A method of using a direct sequence spread spectrum (DSSS) in vehicle location approximation when using orthogonal frequency-division multiplexing (OFDM) comprises the steps of:

(A) providing an orthogonal frequency-division multiplexing (OFDM) device, wherein the OFDM device comprises a wireless terminal and a multiple-input and multiple-output (MIMO) antenna;

(B) encoding a pilot uplink signal through a channel encoding module of the OFDM device, wherein the pilot uplink signal is encoded as a direct-sequence spread spectrum (DSSS);

(C) transmitting the pilot uplink signal from the wireless terminal to at least one intended target, wherein the at least one intended target is within an operational range of the MIMO antenna;

(D) receiving an ambient signal at the wireless terminal, wherein the ambient signal comprises a reflected-pilot uplink signal generated when the pilot uplink signal contacts the at least one intended target;

(E) filtering out the reflected-pilot uplink signal from the ambient signal through the OFDM device, wherein the reflected-pilot uplink signal is encoded as a DSSS;

(F) decoding the DSSS of the reflected-pilot uplink signal through a channel decoding module the OFDM device; and (G) deriving a location approximation for the at least one intended target through the OFDM device, wherein the location approximation is derived from a matching time delay between the pilot uplink signal and the reflected-pilot uplink signal calculated by the OFDM device, and a direction of arrival (DOA) of the ambient signal derived through the MIMO antenna.

2. The method of using a DSSS in vehicle location approximation when using OFDM as claimed in claim 1 further comprises:

providing the OFDM device with a pseudo-noise (PN) sequence generator;

modulating the pilot uplink signal as a PN sequence through the PN sequence generator;

demodulating the reflected-pilot uplink signal as a PN sequence through the PN sequence generator; and measuring the time delay between the pilot uplink signal and the reflected-pilot uplink signal as a PN period shift through the OFDM device.

3. The method of using a DSSS in vehicle location approximation when using OFDM as claimed in claim 1 further comprises the steps of:

providing the OFDM device with a match-filtering unit and a rake receiver;

transferring the ambient signal through the match-filtering unit and the rake receiver;

determining the DOA by filtering out a downlink signal of the ambient signal through the match-filtering unit;

calculating the matching time delay by autocorrelating the pilot uplink signal and the reflected-pilot uplink signal at the rake receiver through the DSSS; and displaying an autocorrelation output for the matching time delay through the OFDM device, wherein the autocorrelation output corresponds to the at least one intended target.

4. The method of using a DSSS in vehicle location approximation when using OFDM as claimed in claim 1 further comprises the steps of:

providing the OFDM device with a signal generator unit;

adding a cyclic prefix to the pilot uplink signal through a cyclic extension process of the signal generator unit; and removing the cyclic prefix of the reflected-pilot uplink signal through the cyclic extension process of the signal generator unit.

5. The method of using a DSSS in vehicle location approximation when using OFDM as claimed in claim 1 further comprises the steps of:

providing the OFDM device with a radar processor;

calculating the matching time delay between the pilot uplink signal and the reflected-pilot uplink signal through the OFDM device;

deriving the DOA for the ambient signal through the MIMO antenna; and deriving the location approximation for the at least one intended target by through the radar processor, wherein the matching time delay and the DOA of the ambient signal are inputs to the radar processor.

6. The method of using a DSSS in vehicle location approximation when using OFDM as claimed in claim 1, wherein the ambient signal further comprises a downlink signal and a plurality of echo signals, wherein the plurality of echo signals is generated when the pilot uplink signal is reflected from the at least one intended target onto a plurality of target-surrounding objects and off the plurality of target-surrounding objects.

7. The method of using a DSSS in vehicle location approximation when using OFDM as claimed in claim 1 further comprises the steps of:

wherein the at least one intended target is a plurality of targets; and receiving a corresponding reflected-pilot uplink signal from each of the plurality of targets.

8. The method of using a DSSS in vehicle location approximation when using OFDM as claimed in claim 1, wherein the pilot uplink signal is transmitted via beamforming.

9. The method of using a DSSS in vehicle location approximation when using OFDM as claimed in claim 1, wherein the reflected-pilot uplink signal is received via beamforming.

10. The method of using a DSSS in vehicle location approximation when using OFDM as claimed in claim 1, wherein the MIMO antenna is an antenna array.

11. The method of using a DSSS in vehicle location approximation when using OFDM as claimed in claim 1, wherein the pilot uplink signal comprises a plurality of subcarriers.

* * * * *